United States Patent [19]

Hirano

[11] Patent Number: 5,732,369
[45] Date of Patent: Mar. 24, 1998

[54] MOVEMENT STATE ESTIMATION METHOD IN WHEELED VEHICLE

[75] Inventor: Yutaka Hirano, Susono, Japan

[73] Assignee: Toyota Jidosha Kabushiki Kaisha, Toyota, Japan

[21] Appl. No.: 491,221

[22] Filed: Jun. 16, 1995

[30] Foreign Application Priority Data

Jun. 20, 1994 [JP] Japan ................................. 6-137570

[51] Int. Cl.$^6$ ................................................ B62D 6/00
[52] U.S. Cl. ........................ 701/1; 701/42; 180/410
[58] Field of Search .................... 364/423.098, 424.052, 364/426.016; 180/197, 408, 410–413, 421–423; 280/91.9

[56] References Cited

U.S. PATENT DOCUMENTS

| | | | |
|---|---|---|---|
| 4,942,532 | 7/1990 | Mori | 364/424.052 |
| 5,003,480 | 3/1991 | Mori et al. | 364/424.052 |
| 5,029,660 | 7/1991 | Raad et al. | 364/424.052 |
| 5,267,160 | 11/1993 | Ito et al. | 364/424.052 |
| 5,412,571 | 5/1995 | Eguchi et al. | 364/424.052 |
| 5,524,079 | 6/1996 | Ishida et al. | 364/424.052 |

FOREIGN PATENT DOCUMENTS

| | | |
|---|---|---|
| 62-83247 | 4/1987 | Japan . |
| 62-88665 | 4/1987 | Japan . |
| 2-45802 | 2/1990 | Japan . |
| 3-125940 | 5/1991 | Japan . |
| A-4-5802 | 1/1992 | Japan . |

OTHER PUBLICATIONS

English–language abstract of Japanese Laid–Open Patent Publication No. 3–125940.
English–language abstract of Japanese Laid–Open Patent Publication No. 62–83247.
English–language abstract of Japanese Laid–Open Patent Publication No. 62–88665.
English–language abstract of Japanese Laid–Open Patent Publication No. 2–45802.
Palkovics, "Effect of the Controller Parameters on the Steerability of the Four Wheel Steered Car", *Vehicle System Dynamics*, vol. 21, No. 2 (1992), pp. 109–114.
Tran, "Handling Control with Additional Rear Wheel Steering", *Total Vehicle Dynamics*, vol. 1 (1992), pp. 75–81.

*Primary Examiner*—Gary Chin
*Attorney, Agent, or Firm*—Oliff & Berridge PLC

[57] ABSTRACT

A movement state estimation method wherein a state equation of an observer is converted into a discrete equation by bilinear transformation and successively calculated to estimate unobserved movement state variables on a basis of observable movement state variables applied as a reference input.

7 Claims, 4 Drawing Sheets

MOVEMENT STATE ESTIMATION METHOD IN WHEELED VEHICLE

BACKGROUND OF THE INVENTION

1. Field of the Invention

The present invention relates to a movement state estimation method in a wheeled vehicle for estimating movement state variables such as a lateral slip angle, a yaw rate, a lateral acceleration, etc., of the vehicle in turning, and more particularly to a movement state estimation method wherein an observer related to a movement state model of a wheeled vehicle is applied with at least one of observable movement state variables of the vehicle as a reference input to estimate unobserved movement state variables of the vehicle.

2. Description of Prior Art

Disclosed in Japanese Patent Laid-open Publication 45802/1990 is a movement state estimation method wherein a movement state model of a wheeled vehicle is applied with steering angle data as a reference input for changing a coefficient and a feedback gain of movement state variables of the vehicle in accordance with a travel speed of the vehicle, and wherein an observer related to the movement state model is applied with yaw angle acceleration data as a reference input for estimating a yaw rate and a lateral acceleration based on a state equation of the observer.

In such a conventional movement state estimation method, the state equation of the observer is not represented in discreteness. As a result, an error in the estimated value is accumulated when the movement state variables of the vehicle are successively calculated by a calculation means such as a microcomputer. Accordingly, a deviation of the estimated value and the detected movement state variables of the vehicle does not converge into "0". In addition, noise and drift components are inevitably included in output of a sensor for detection of the movement state variables of the vehicle. For the foregoing reasons, accurate estimation of the movement state variables of the vehicle may not be realized.

SUMMARY OF THE INVENTION

It is, therefore, a primary object of the present invention to provide an improved movement state estimation method capable of constantly realizing accurate estimation of movement state variables of a wheeled vehicle.

According to the present invention, the object is accomplished by providing a movement state estimation method wherein a state equation of an observer is converted into a discrete equation by bilinear transformation and successively calculated to estimate unobserved movement state variables on a basis of observable movement state variables applied as a reference input.

In such a movement state estimation method, the successive calculation of the converted discrete equation is effective to avoid accumulation of an error in the estimated value so that a deviation of the estimated value and the detected movement state variables is constantly converged into "0".

According to an aspect of the present invention, there is provided a movement state estimation method wherein a movement state model of the vehicle includes a filter for eliminating an error in movement state variables of the vehicle applied thereto as a reference input, and wherein a state equation of an observer related to the movement state model is applied with a characteristic of the filter.

In such a movement state estimation method as described above, application of the characteristic of the filter to the state equation is useful to effect accurate estimation of the movement state variables in spite of noise and drift components included in the detected movement state variables.

BRIEF DESCRIPTION OF THE DRAWINGS

Other objects, features and advantages of the present invention will be readily appreciated from the following detailed description of preferred embodiments thereof when taken together with the accompanying drawings, in which.

Hereinafter, a fundamental theory of a movement state estimation method in accordance with the present invention will be described for a better understanding.

In the case that a lateral slip angle $\beta$ and a yaw rate $\gamma$ of a wheeled vehicle are estimated as movement state variables of the vehicle determined by a travel speed V, a front wheel steering angle $\delta f$ and a rear wheel steering angle $\delta r$, the lateral slip angle $\beta$, yaw rate $\gamma$, travel speed V and steering angles $\delta f$, $\delta r$ are represented by the following equations of motion.

$$dX/dt = AX + BU \qquad (1)$$

$$X = \begin{bmatrix} \beta \\ \gamma \end{bmatrix} \qquad (2)$$

$$U = \begin{bmatrix} \delta_f \\ \delta_r \end{bmatrix} \qquad (3)$$

$$A = \begin{bmatrix} a_{11} & a_{12} \\ a_{21} & a_{22} \end{bmatrix} = \begin{bmatrix} -\frac{c_f + c_r}{MV} & -1 - \frac{a_f c_f - a_r c_r}{MV^2} \\ -\frac{a_f c_f - a_r c_r}{I_z} & -\frac{a_f^2 c_f + a_r^2 c_r}{I_z V} \end{bmatrix} \qquad (4)$$

$$B = \begin{bmatrix} b_{11} & b_{12} \\ b_{21} & b_{22} \end{bmatrix} = \begin{bmatrix} \frac{c_f}{MV} & \frac{c_r}{MV} \\ \frac{a_f c_f}{I_z} & -\frac{a_r c_r}{I_z} \end{bmatrix} \qquad (5)$$

In the equations (4) and (5), M is weight of the vehicle, $I_z$ is a yawing inertia moment of the vehicle, $a_f$ is a horizontal distance from the center of gravity of the vehicle to a front wheel axle, $a_r$ is a horizontal distance from the center of gravity of the vehicle to a rear wheel axle, $c_f$ is a cornering power of front road wheels, and $c_r$ is a cornering power of rear road wheels. These values each are processed as a fixed value in the wheeled vehicle.

In this case, the yaw rate $\gamma$ of the movement state variables may be detected by an angular speed sensor. In the case that each average speed $\omega_l$, $\omega_r$ of the left and right road wheels is detected, the yaw rate $\gamma$ may be calculated by the following equations.

$$\omega_{rl} = \omega_l - \omega_r \quad (6)$$

$$\gamma = \frac{\omega_{rl}}{Tr} \quad (7)$$

where "Tr" represents a tread of the vehicle.

Since measurement of the lateral slip angle $\beta$ is difficult, the lateral slip angle $\beta$ is deemed as an unobserved movement state variable. Accordingly, in the case that an observer is applied with the yaw rate $\gamma$ as a reference input for estimation of the lateral slip angle $\beta$, an output equation of the movement state model is represented by the following equations (8) and (9).

$$Y = CX \quad (8)$$

$$C = [0 \ 1] \quad (9)$$

Figure 1:
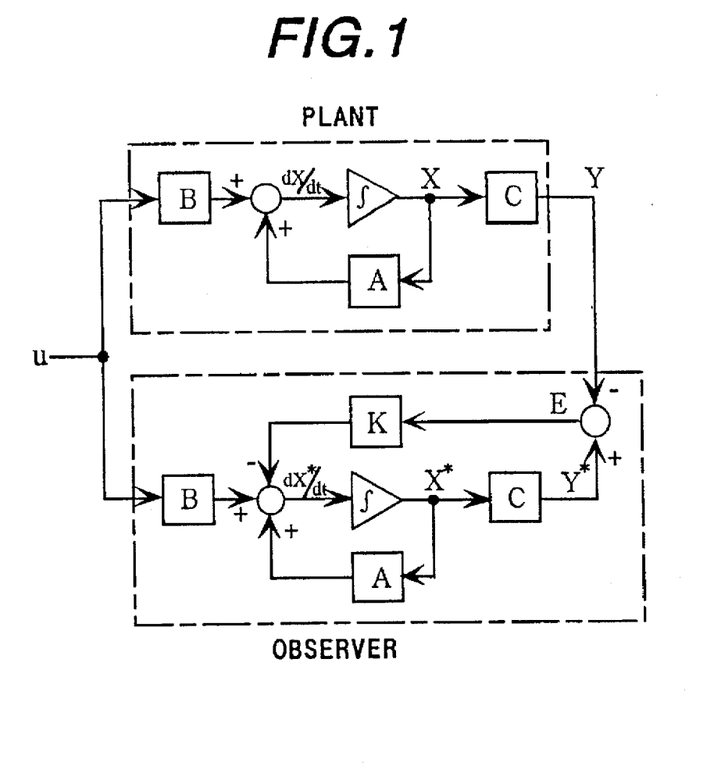
FIG. 1 is a block diagram of a movement state model of a wheeled vehicle and an identity observer related thereto.

In the case that an identity observer is composed with respect to the movement state model (plant) of the vehicle represented by the equations (1)–(5) and (8), (9), the entire model is represented as shown in FIG. 1. In this case, the state equation of the observer is represented as described below.

$$dX^*/dt = (A - KC)X^* + KY + BU = AX^* + BU - KC(X^* - X) \quad (10)$$

where $X^*$ is an estimated value of X, $dX^*/dt$ is a differentiated value of the estimated value, and K is a feedback gain of the observer. Assuming that a pole of "A−KC" is represented by $P_1$, $P_2$ (predetermined negative constant), $X^*$ is converged into X. In the case that the pole of "A−KC" is represented by $P_1$, $P_2$ and that a Laplace operator is represented by "s", the feedback gain K is represented by the following equations.

$$|sI - (A - KC)| = (s - p_1)(s - p_2) \quad (11)$$

$$K = \begin{bmatrix} -\{a_{11}(-a_{11} + p_1 + p_2) - p_1 p_2 - a_{21}a_{12}\}/a_{21} \\ a_{11} + a_{22} - (p_1 + p_2) \end{bmatrix} = \begin{bmatrix} k_1 \\ k_2 \end{bmatrix} \quad (12)$$

Since elements "$a_{11}$–$a_{22}$", "$b_{11}$–$b_{22}$" of the foregoing coefficients A, B each are a function of the vehicle speed V as defined in the equations (4) and (5), the feed-back gain K becomes a function of the vehicle speed V. Thus, an observer the pole of which is defined by p1, p2 can be composed without depending on the vehicle speed V.

In a practical calculation, it is necessary to make the equation (10) discrete. Assuming that a control period or calculation cycle is represented by "T", a discrete system corresponding with the equation (1) is represented as described below.

$$X[n+1] = A_d X[n] + B_d U[n+1] \quad (13)$$

Provided that, the coefficients $A_d$, $B_d$ are represented by the following equations, respectively.

$$A_d = e^{AT} \quad (14)$$

$$B_d = \left( \int_O^T e^{AT} dt \right) B \quad (15)$$

When the equation (13) is applied to the equation (10), the state equation of the observer is represented by the following equation.

$$X^*[n+1] = E_d X^*[n] + K_d Y[n+1] + F_d U[n+1] \quad (16)$$

Provided that, the coefficients $E_d$, $K_d$, $F_d$ are represented as described below.

$$E_d = e^{(A - KC)T} \quad (17)$$

$$K_d = \left( \int_O^T e^{(A - KC)t} dt \right) K \quad (18)$$

$$F_d = \left( \int_O^T e^{(A - KC)t} dt \right) B \quad (19)$$

In conversion into the discrete system "A−KC", "K", "B" in the foregoing equations (16)–(19) each fluctuate as a function of the vehicle speed V in accordance with lapse of time. It is, therefore, required to introduce bilinear transformation or Tustin transformation for conversion into the discrete system. In the bilinear transformation, a Laplace operator "s" is represented by the following equation.

$$s = \frac{2(z - 1)}{T(z + 1)} \quad (20)$$

where "z" is a retard operator, and "$z^{-d}X[n]$" corresponds with "X[n−d]".

Thus, the equation (10) can be rewritten by using the Laplace operator "s" as described below.

$$s\beta^* = a_{11}\beta^* + (a_{11} - k_1)\gamma^* + k_1\gamma + b_{11}\delta_f + b_{12}\delta_r \quad (21)$$

$$s\gamma^* = a_{21}\beta^* + (a_{22} - k_2)\gamma^* + k_2\gamma + b_{21}\delta_f + b_{22}\delta_r \quad (22)$$

When the above equation (20) is substituted into the equations (21) and (22) and expanded, the following equation is obtained.

$$\begin{bmatrix} z\beta^* \\ z\gamma^* \end{bmatrix} = \begin{bmatrix} 2 - Ta_{11} & -T(a_{12} - k_1) \\ -Ta_{21} & 2 - T(a_{22} - k_2) \end{bmatrix}^{-1} \left\{ \begin{bmatrix} 2 + Ta_{11} & T(a_{12} - k_1) \\ Ta_{21} & 2 + T(a_{22} - k_2) \end{bmatrix} \begin{bmatrix} \beta^* \\ \gamma^* \end{bmatrix} + \begin{bmatrix} T(z + 1)(k_1\gamma + b_{11}\delta_f + b_{12}\delta_r) \\ T(z + 1)(k_2\gamma + b_{21}\delta_f + b_{22}\delta_r) \end{bmatrix} \right\} \quad (23)$$

When each coefficient of the equation (23) is expanded as a function of the vehicle speed V by using the equations (4) and (5), the following equation is obtained.

$$\begin{bmatrix} z\beta^* \\ z\gamma^* \end{bmatrix} = \begin{bmatrix} g_{11} & g_{12} \\ g_{21} & g_{22} \end{bmatrix} \begin{bmatrix} \beta^* \\ \gamma^* \end{bmatrix} + \begin{bmatrix} h_{11} & h_{12} \\ h_{21} & h_{22} \end{bmatrix} \begin{bmatrix} T(z + 1)(k_1\gamma + b_{11}\delta_f + b_{12}\delta_r) \\ T(z + 1)(k_2\gamma + b_{21}\delta_f + b_{22}\delta_r) \end{bmatrix} \quad (24)$$

In the equation (24), "$g_{11}$–$g_{22}$" and "$h_{11}$–$h_{22}$" are represented as described below.

$$g_{11} = \frac{1}{4 - 2(p_1 + p_2)T + p_1 p_2 T^2} \cdot \left\{ 4 - 2(p_1 + p_2)T - p_1 p_2 T^2 - \frac{4(c_f + c_r)T}{MV} \right\} \quad (25)$$

$$g_{12} = \frac{1}{4 - 2(p_1 + p_2)T + p_1 p_2 T^2} \cdot \frac{4I_z T}{a_f c_f - a_r c_r} \left\{ p_1 p_2 + \frac{(c_f + c_r)(p_1 + p_2)}{MV} + \frac{(c_f + c_r)^2}{M^2 V^2} \right\} \quad (26)$$

$$g_{21} = \frac{1}{4 - 2(p_1 + p_2)T + p_1 p_2 T^2} \cdot \frac{-4(a_f c_f - a_r c_r)T}{I_z} \quad (27)$$

$$g_{22} = \frac{1}{4 - 2(p_1 + p_2)T + p_1 p_2 T^2} \cdot \quad (28)$$

$$\left\{ 4 + 2(p_1 + p_2)T - p_1 p_2 T^2 + \frac{4(c_f + c_r)T}{MV} \right\}$$

$$h_{11} = \frac{1}{4 - 2(p_1 + p_2)T + p_1 p_2 T^2} \cdot \quad (29)$$

$$\left\{ 2 - \left( p_1 + p_2 + \frac{c_f + c_r}{MV} \right) T \right\}$$

$$h_{12} = \frac{1}{4 - 2(p_1 + p_2)T + p_1 p_2 T^2} \cdot \frac{I_z T}{a_f c_f - a_r c_r} \cdot \quad (30)$$

$$\left\{ p_1 p_2 + \frac{(c_f + c_r)(p_1 + p_2)}{MV} + \frac{(c_f + c_r)^2}{M^2 V^2} \right\}$$

$$h_{21} = \frac{1}{4 - 2(p_1 + p_2)T + p_1 p_2 T^2} \cdot \frac{-(a_f c_f - a_r c_r)T}{I_z} \quad (31)$$

$$h_{22} = \frac{1}{4 - 2(p_1 + p_2)T + p_1 p_2 T^2} \cdot \left\{ 2 + \frac{(c_f + c_r)T}{MV} \right\} \quad (32)$$

When the equation (24) is rewritten into a discrete system, the following equation is obtained.

$$\begin{bmatrix} \beta^*[n+1] \\ \gamma^*[n+1] \end{bmatrix} \begin{bmatrix} g_{11}[n+1] & g_{12}[n+1] \\ g_{21}[n+1] & g_{22}[n+1] \end{bmatrix} \begin{bmatrix} \beta^*[n] \\ \gamma^*[n] \end{bmatrix} + \quad (33)$$

$$\begin{bmatrix} h_{11}[n+1] & h_{12}[n+1] \\ h_{21}[n+1] & h_{22}[n+1] \end{bmatrix} \begin{bmatrix} d_1 \\ d_2 \end{bmatrix}$$

Provided that, "$d_1$, $d_2$" in the equation (33) are represented by the following equations.

$$d_1 = T(k_1[n+1]\gamma[n+1] + b_{11}[n+1]\delta_f[n+1] + \quad (34)$$

$$b_{12}[n+1]\delta_r[n+1] + k_1[n]\gamma[n] +$$

$$b_{11}[n]\delta_f[n] + b_{12}[n]\delta_r[n])$$

$$d_2 = T(k_2[n+1]\gamma[n+1] + b_{21}[n+1]\delta_f[n+1] + \quad (35)$$

$$b_{22}[n+1]\delta_r[n+1] + k_2[n]\gamma[n] +$$

$$b_{21}[n]\delta_f[n] + b_{22}[n]\delta_r[n])$$

When the equation (33) is successively calculated on a basis of the equations (25)–(32), (34) and (35), a yaw rate $\gamma^*$ and a lateral slip angle $\beta^*$ can be estimated as movement state variables of the vehicle.

Figure 2:
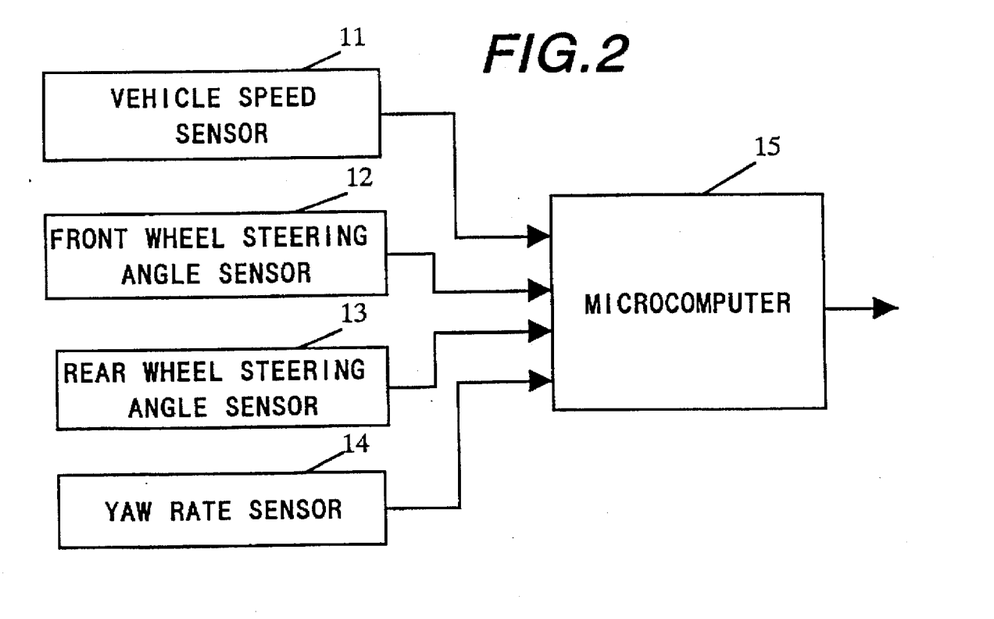
FIG. 2 is a block diagram of a first embodiment of a movement state estimation apparatus for a wheeled vehicle in accordance with the present invention.

Hereinafter, a first embodiment of a movement state estimation apparatus for estimating a lateral slip angle $\beta^*$ and a yaw rate $\gamma^*$ of a wheeled vehicle will be described on a basis of the foregoing estimation theory. As shown in FIG. 2, the movement state estimation apparatus includes a microcomputer 15 connected to a vehicle speed sensor 11, a front wheel steering angle sensor 12, a rear wheel steering angle sensor 13 and a yaw rate sensor 14 to calculate the lateral slip angle $\beta^*$ and yaw rate $\gamma^*$ for various control of the vehicle. The vehicle speed sensor 11 is arranged to detect a travel speed V of the vehicle for producing an electric signal indicative of the vehicle speed V, and the front wheel steering angle sensor 12 is arranged to detect a front wheel steering angle $\delta f$ for producing an electric signal indicative of the front steering angle $\delta f$. The rear wheel steering angle sensor 13 is arranged to detect a rear wheel steering angle $\delta r$ for producing an electric signal indicative of the rear wheel steering angle $\delta r$, and the yaw rate sensor 14 is arranged to detect a yaw rate $\gamma$ of the vehicle for producing an electric signal indicative of the yaw rate $\gamma$. The microcomputer 15 is programmed to repeat execution of a program shown by a flow chart in FIG. 3 upon each lapse of a predetermined time T identical with the control period or calculation cycle described above.

Figure 3:
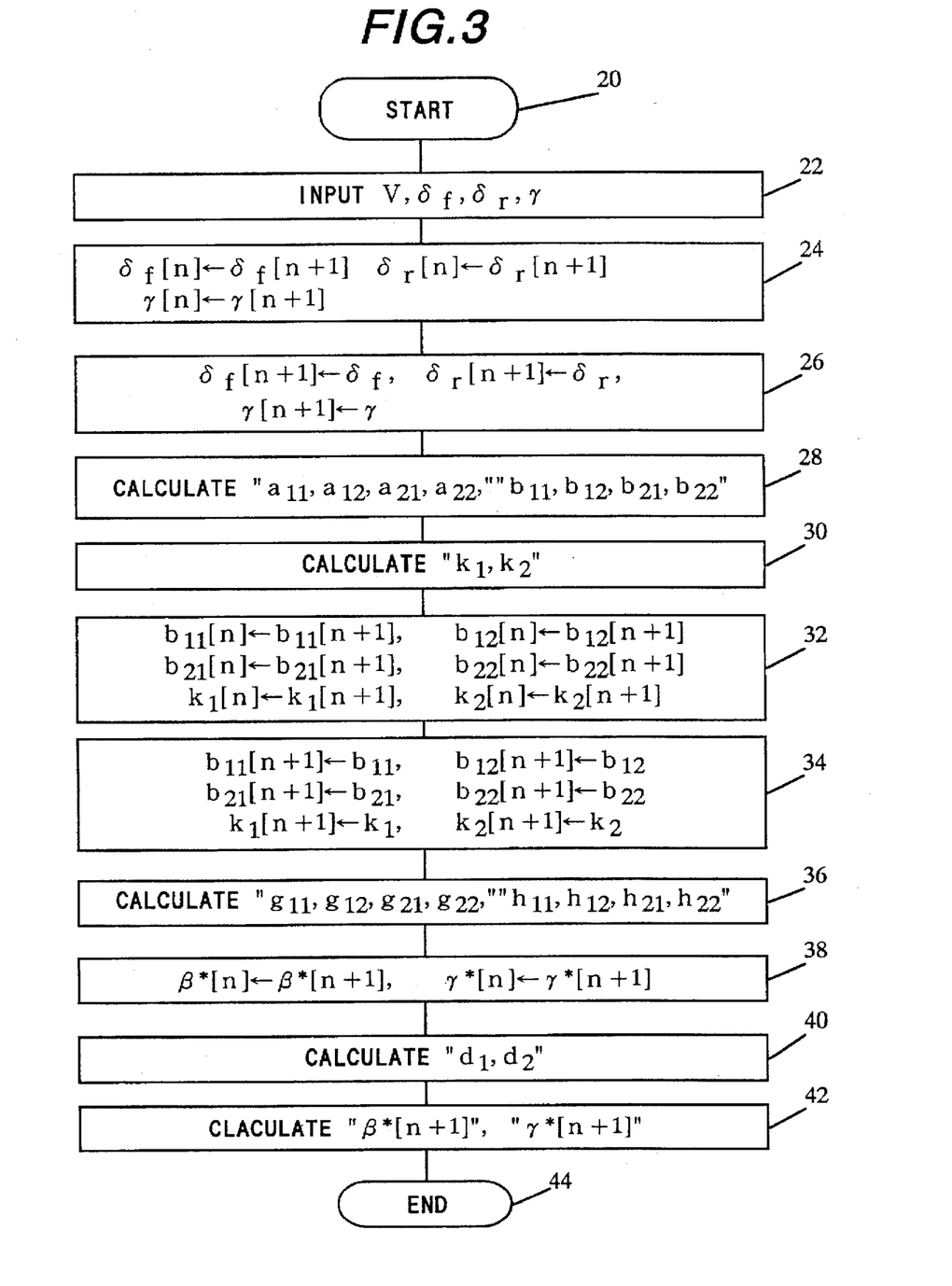
FIG. 3 is a flow chart of a program executed by a microcomputer shown in FIG. 2.

In operation, the computer 15 starts at step 20 to execute the program shown in FIG. 3. At step 22, the computer 15 reads out electric signals respectively indicative of a vehicle speed V, a front wheel steering angle $\delta_f$, a rear wheel steering angle $\delta_r$, and a yaw rate $\gamma$ from the sensors 11, 12, 13 and 14. Subsequently, the computer 15 renews at step 24 previous data $\delta_f[n]$, $\delta_r[n]$, $\delta[n]$ respectively indicative of prior steering angles $\delta_f$, $\delta_r$ and yaw rate $\gamma$ as present data $\delta_f[n+1]$, $\delta_r[n+1]$, $\gamma[n+1]$ respectively indicative of instant steering angles $\delta_f$, $\delta_r$ and yaw rate $\gamma$ and renews at step 26 the present data $\delta_f[n+1]$, $\delta_r[n+1]$, $\gamma[n+1]$ as the read out data $\delta_f$, $\delta_r$, $\gamma$.

After processing at step 26, the computer 15 calculates at step 28 the coefficients A ($a_{11}$, $a_{12}$, $a_{21}$, $a_{22}$) and B ($b_{11}$, $b_{12}$, $b_{21}$, $b_{22}$) of the model shown in FIG. 1 on a basis of the equations (4) and (5). In this instance, the vehicle speed V is detected by processing at step 22 but other parameters M, $I_z$, $a_f$, $a_r$, $c_f$, $c_r$ each are preliminarily determined as constant in accordance with the type of the vehicle. At the following step 30, the computer 15 calculates feedback gains $k_1$, $k_2$ based on the equation (12) using poles $P_1$, $P_2$ and the calculated coefficients A ($a_{11}$, $a_{12}$, $a_{21}$, $a_{22}$). Subsequently, the computer 15 renews at step 32 the previous coefficients $b_{11}[n]$–$b_{22}[n]$ and feedback gains $k_1[n]$, $k_2[n]$ respectively indicative of prior coefficients B ($b_{11}$, $b_{12}$, $b_{21}$, $b_{22}$) and prior feedback gains $k_1$, $k_2$ as the present coefficients $b_{11}[n+1]$–$b_{22}[n+1]$ and feedback gains $k_1[n+1]$, $k_2[n+1]$ respectively indicative of instant coefficients B ($b_{11}$, $b_{12}$, $b_{21}$, $b_{22}$) and instant feedback gains $k_1$, $k_2$. At the following step 34, the computer 15 renews the present coefficients $b_{11}[n+1]$–$b_{22}[n+1]$ and feedback gains $k_1[n+1]$, $k_2[n+1]$ as the calculated coefficients $b_{11}$–$b_{22}$ and feedback gains $k_1$, $k_2$.

After processing at step 34, the computer 15 calculates at step 36 coefficients $g_{11}$–$g_{22}$, $h_{11}$–$h_{22}$ by execution of the equations (25)–(32) using the poles $P_1$, $P_2$, calculation period T, parameters M, $I_z$, $a_f$, $a_r$, $c_f$, $c_r$ and the detected vehicle speed V. Thereafter, the computer 15 renews at step 38 previously estimated lateral slip angle $\beta^*[n]$ and yaw rate $\gamma^*[n]$ indicative of prior lateral slip angle $\beta^*$ and yaw rate $\gamma^*$ estimated before the time T as the presently estimated lateral slip angle $\beta^*[n+1]$ and yaw rate $\delta^*[n+1]$ calculated by processing at step 42 before the time T. Subsequently, the computer 15 calculates at step 40 values $d_1$, $d_2$ by execution of the equations (34), (35) using the previous data $b_{11}[n]$–$b_{22}[n]$, $k_1[n]$, $k_2[n]$, $\delta_f[n]$, $\delta_r[n]$, $\gamma[n]$ and the present data $b_{11}[n+1]$–$b_{22}[n+1]$, $k_1[n+1]$, $k_2[n+1]$, $\delta_f[n+1]$, $\delta_r[n+1]$, $\gamma[n+1]$. At the following step 42, the computer 15 calculates the presently estimated lateral slip angle $\beta^*[n+1]$ and yaw rate $\gamma^*[n+1]$ by execution of the equation (33) using the previously estimated lateral slip angle $\beta^*[n]$ and yaw rate $\gamma^*[n]$ and the calculated values $d_1$, $d_2$ and using the coefficients $g_{11}$–$g_{22}$, $h_{11}$–$h_{22}$ as the present coefficients $g_{11}[n+1]$–$g_{22}[n+1]$, $h_{11}[n+1]$–$h_{22}[n+1]$. Thus, the computer 15 finishes at step 44 the execution of the program, and the calculated lateral slip angle $\beta^*[n+1]$ and yaw rate $\gamma^*[n+1]$ are used for control of movement state of the vehicle.

As is understood from the above description, the movement state estimation method in the first embodiment is characterized in that the movement state model of the vehicle is in the form of a plant which is applied with the front and rear steering angle data $\delta f$ and $\delta r$, that the observer is applied with the yaw rate $\gamma$ as a reference input and that the state equation of the observer is converted into a discrete equation by bilinear transformation and successively calculated to estimate the lateral slip angle $\beta^*$ and yaw rate $\gamma^*$.

Figure 4:
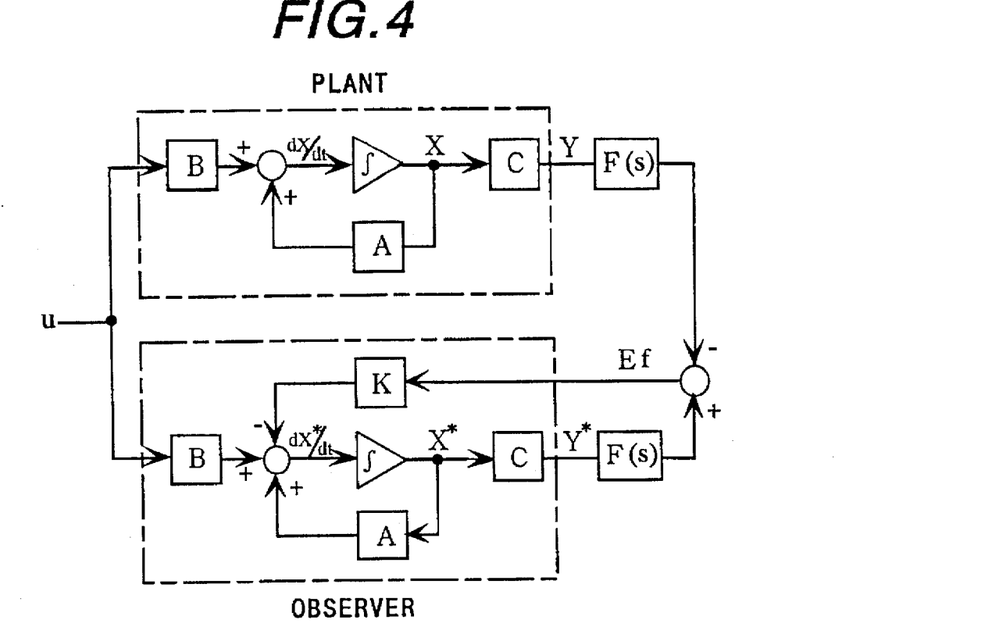
FIG. 4 is a block diagram of a modified model wherein the observer of FIG. 1 is corrected in frequency.

Hereinafter, a second embodiment of a movement state estimation method according to the present invention will be described with reference to FIG. 4. In this embodiment, a deviation E of the observer output $Y^*$ and the plant output Y in the identity observer is converged into "0" to make the estimated value $X^*$ identical with a real value X as described below.

$$E = Y^* - Y = C(X^* - X) = \gamma^* - \gamma \tag{36}$$

Figure 5:
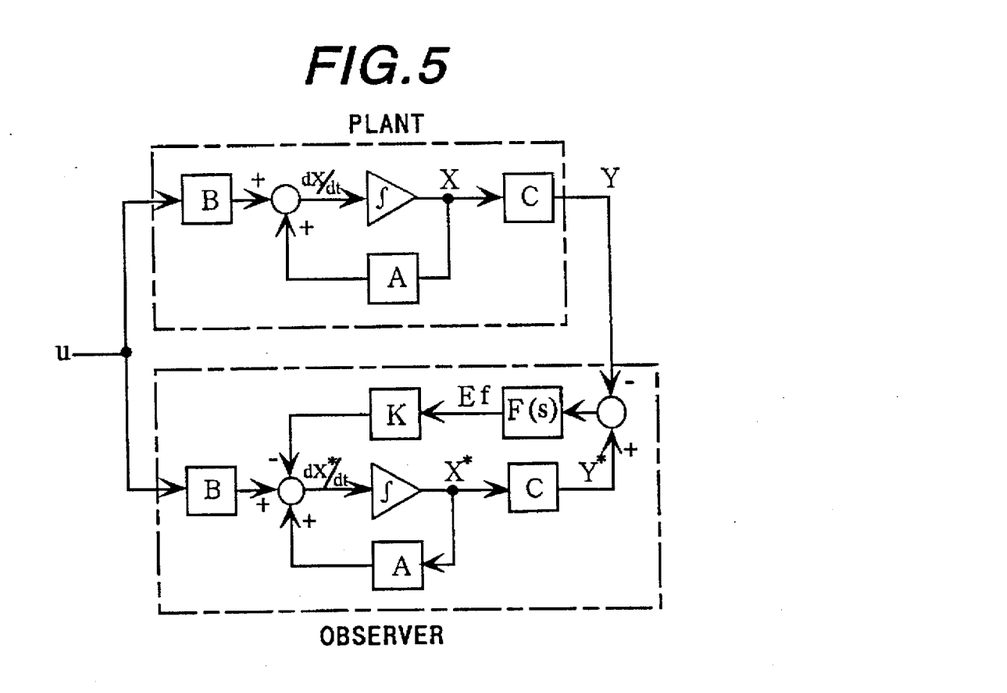
FIG. 5 is an equivalent block diagram of the modified model shown in FIG. 4.

In actual output data of the foregoing sensors, however, there are included noise and temperature drift components which cause an error in measurement of the output Y of the plant. To eliminate the noise and temperature drift components, it is effective to apply a filter such as a low-pass filter, a band-pass filter or a high-pass filter to the output Y of the plant. In the case that the filter is applied to the output Y of the plant, there will occur a phase difference between the output Y of the plant and the output $Y^*$ of the observer. It is, therefore, preferable that the same filter as in the plant is applied to the output $Y^*$ of the observer. Illustrated in FIG. 4 is an entire model of the vehicle wherein the same filter F(s) is respectively applied to the output Y of the plant and to the output $Y^*$ of the observer. In the case that a filter F(s) is provided in the observer, the entire model of the vehicle is composed as illustrated in FIG. 5. In these entire models, the deviation E in the first embodiment is substituted for a deviation $E_f$ as represented by the following equation.

$$E_f = F(s)Y^* - F(s)Y = F(s)(Y^* - Y) = F(s)E \tag{37}$$

Accordingly, only an effective frequency component in the output deviation is fed back to the input side. In this case, the state equation of the observer shown in FIG. 5 is represented as described below.

$$dX^*/dt = AX^* + BU - KE_f \tag{38}$$

When the equation (38) is rewritten by using the Laplace operator "s", it is converted by bilinear transformation into a discrete equation as described below.

$$\begin{bmatrix} z\beta^* \\ z\gamma^* \end{bmatrix} \begin{bmatrix} 2 - Ta_{11} & -Ta_{12} \\ -Ta_{21} & 2 - Ta_{22} \end{bmatrix}^{-1} \tag{39}$$

$$\left\{ \begin{bmatrix} 2 + Ta_{11} & Ta_{12} \\ Ta_{21} & 2 + Ta_{22} \end{bmatrix} \begin{bmatrix} \beta^* \\ \gamma^* \end{bmatrix} + \begin{bmatrix} T(z+1)(b_{11}\delta_f + b_{12}\delta_r - k_1 E_f) \\ T(z+1)(b_{21}\delta_f + b_{22}\delta_r - k_2 E_f) \end{bmatrix} \right\}$$

When each coefficient of the equation (39) is expanded as a function of the vehicle speed V by using the equations (4), (5) and (12), the equation (39) is represented as described below.

$$\begin{bmatrix} z\beta^* \\ z\gamma^* \end{bmatrix} = \begin{bmatrix} g_{11} & g_{12} \\ g_{21} & g_{22} \end{bmatrix} \begin{bmatrix} \beta^* \\ \gamma^* \end{bmatrix} + \tag{40}$$

$$\begin{bmatrix} h_{11} & h_{12} \\ h_{21} & h_{22} \end{bmatrix} \begin{bmatrix} T(z+1)(b_{11}\delta_f + b_{12}\delta_r - k_1 E_f) \\ T(z+1)(b_{21}\delta_f + b_{22}\delta_r - k_2 E_f) \end{bmatrix}$$

In the above equation (40), "$g_{11}-g_{22}$", "$h_{11}-h_{22}$" are represented by the following equations.

$$g_{11} = \frac{1}{D} \left\{ 4 + \frac{(a_f c_f - a_r c_r)T^2}{I_z} + \tag{41} \right.$$

$$\frac{2\{(a_f^2 c_f + a_r^2 c_r)M - (c_f + c_r)I_z\}T}{MI_z V} -$$

$$\left. \frac{c_f c_r (a_f + a_r)^2 T^2}{MI_z V^2} \right\}$$

$$g_{12} = \frac{1}{D} \left\{ -4T - \frac{4(a_f c_f - a_r c_r)T}{MV^2} \right\} \tag{42}$$

$$g_{21} = \frac{1}{D} \left\{ \frac{-4(a_f c_f - a_r c_r)T}{I_z} \right\} \tag{43}$$

$$g_{22} = \frac{1}{D} \left\{ 4 + \frac{(a_f c_f - a_r c_r)T^2}{I_z} - \tag{44} \right.$$

$$\frac{2\{(a_f^2 c_f + a_r^2 c_r)M - (c_f + c_r)I_z\}T}{MI_z V} -$$

$$\left. \frac{c_f c_r (a_f + a_r)^2 T^2}{MI_z V^2} \right\}$$

$$h_{11} = \frac{1}{D} \left\{ 2 + \frac{(a_r^2 c_f + a_r^2 c_r)T}{I_z V} \right\} \tag{45}$$

$$h_{12} = \frac{1}{D} \left\{ \left(-1 - \frac{(a_f c_f - a_r c_r)}{MV^2}\right) T \right\} \tag{46}$$

$$h_{21} = \frac{1}{D} \cdot \frac{-(a_f c_f - a_r c_r)T}{I_z} \tag{47}$$

$$h_{22} = \frac{1}{D} \left\{ 2 + \frac{(c_f + c_r)T}{MV} \right\} \tag{48}$$

Provided that, "D" in the equations (41)–(48) is represented by the following equation.

$$D = 4 - \frac{(a_f c_f - a_r c_r)T^2}{I_z} + \tag{49}$$

$$\frac{2\{(a_f^2 c_f + a_r^2 c_r)M + (c_f + c_r)I_z\}T}{MI_z V} +$$

$$\frac{c_f c_r (a_f + a_r)^2 T^2}{MI_z V^2}$$

Thus, the equation (40) is rewritten into a discrete system as described below.

$$\begin{bmatrix} \beta^*[n+1] \\ \gamma^*[n+1] \end{bmatrix} = \begin{bmatrix} g_{11}[n+1] & g_{12}[n+1] \\ g_{21}[n+1] & g_{22}[n+1] \end{bmatrix} \begin{bmatrix} \beta^*[n] \\ \gamma^*[n] \end{bmatrix} + \tag{50}$$

$$\begin{bmatrix} h_{11}[n+1] & h_{12}[n+1] \\ h_{21}[n+1] & h_{22}[n+1] \end{bmatrix} \begin{bmatrix} d_1 \\ d_2 \end{bmatrix}$$

In the equation (50), values $d_1$, $d_2$ are represented as described below.

$$d_1 = T(b_{11}[n+1]\delta_f[n+1] + b_{12}[n+1]\delta_r[n+1] - \tag{51}$$

$$k_1[n+1]E_f[n] + b_{11}[n]\delta_f[n] +$$

-continued $$d_2 = T (b_{21}[n+1]\delta_f[n+1] + b_{22}[n+1]\delta_r[n+1] - \quad (52)$$

$$k_2[n+1]E_f[n] + b_{21}[n]\delta_f[n] +$$

$$b_{22}[n]\delta_r[n] - k_2[n]E_f[n-1])$$

$$b_{12}[n]\delta_r[n] - k_1[n]E_f[n-1])$$

In the case that a 2nd order Butterworth filter is used as the filter F(s), "$E_f[n]$" in the equations (51) and (52) is represented by the following equation.

$$E_f[n]=a_0E[n]+a_1E[n-1]+a_2E[n-2]+b_1E_f[n-1]+b_2E_f[n-2] \quad (53)$$

where "$a_0$, $a_1$, $a_2$, $b_1$, $b_2$" each are a coefficient of the Butterworth filter.

Hereinafter, a second embodiment of a movement state estimation apparatus for estimating a lateral slip angle $\beta^*$ and a yaw rate $\gamma^*$ of a wheeled vehicle will be described on a basis of the foregoing estimation theory. In this embodiment, the computer 15 is programmed to execute the same program as that in the first embodiment except for a portion of the program shown in FIG. 3 and a program shown by a flow chart in FIG. 6.

In operation, the computer 15 executes processing at step 22 to 34 shown in FIG. 3 to read out electric signals respectively indicative of a vehicle speed V, a front wheel steering angle $\delta_f$, a rear wheel steering angle $\delta_r$ and a yaw rate $\gamma$ from the sensors 11, 12, 13 and 14 so as to obtain previous coefficient data $b_{11}[n]$–$b_{22}[n]$ and previous feedback gains $k_1$, $k_2$ respectively indicative of prior coefficients B($b_{11}$, $b_{12}$, $b_{21}$, $b_{22}$) of the movement state model and feedback gains $k_1$, $k_2$ and present coefficient data $b_{11}[n+1]$–$b_{22}[n+1]$ and feedback gains $k_1[n+1]$, $k_2[n+1]$ respectively indicative of instant coefficients B($b_{11}$, $b_{12}$, $b_{21}$, $b_{22}$) of the model and instant feedback gains $k_1$, $k_2$.

Figure 6:
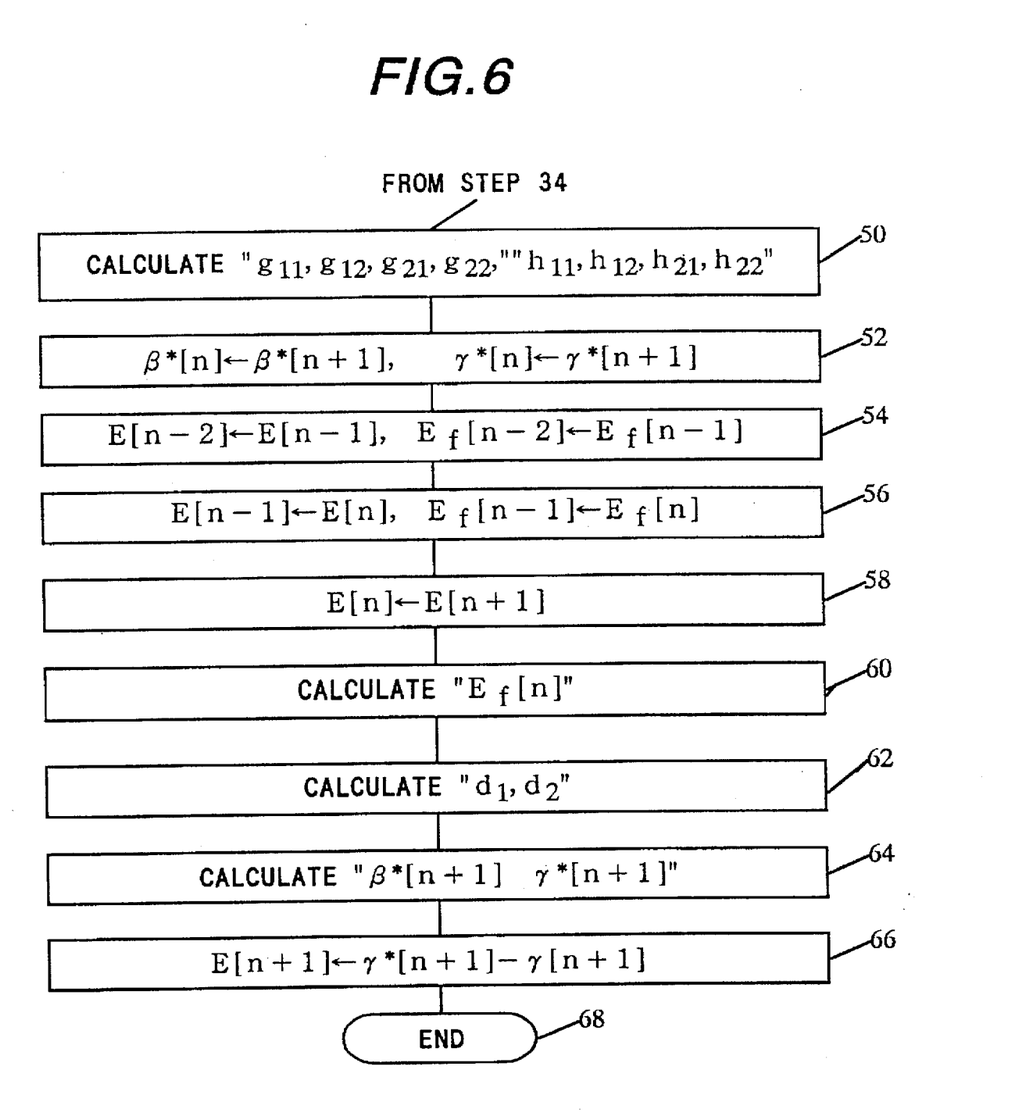
FIG. 6 is a flow chart of a program adapted to a second embodiment of the present invention.

When the program proceeds to step 50 shown in FIG. 6, the computer 15 calculates coefficients $g_{11}$–$g_{22}$, $h_{11}$–$h_{22}$ based on calculation of the equations (41)–(49) using the parameters M, $I_z$, $a_f$, $a_r$, $c_f$, $c_r$ and the detected vehicle speed V. At the following step 52, the computer 15 renews previously estimated lateral slip angle $\beta^*[n]$ and yaw rate $\gamma^*[n]$ indicative of prior lateral slip angle $\beta^*$ and yaw rate $\gamma^*$ estimated before the time T as the presently estimated lateral slip angle $\beta^*[n+1]$ and yaw rate $\gamma^*[n+1]$ calculated by processing at step 64 before the time T. Subsequently, the computer 15 executes processing at step 54–58 to renew the preceding time series deviation data E[n–2], E[n–1], E[n] indicative of a deviation E of the estimated yaw rate $\gamma^*$ and the detected yaw rate $\gamma$ with the following time series deviation data E[n–1], E[n], E[n+1] and to renew time series deviation data $E_f[n-2]$, $E_f[n-1]$ prior to the preceding time series deviation data indicative of a deviation $E_f$ of the filtered yaw rate $\gamma^*$ and the detected yaw rate $\gamma_f$ as the following time series deviation data $E_f[n-1]$, $E_f[n]$.

After processing at step 58, the computer 15 calculates at step 60 the preceding deviation data $E_f[n]$ by execution of the equation (53) using the deviation data E[n], E[n–1], E[n–2], $E_f[n-1]$, $E_f[n-2]$ and the coefficients $a_0$, $a_1$, $a_2$, $b_1$, $b_2$ of the Butterworth filter. Subsequently, the computer 15 calculates at step 62 values $d_1$, $d_2$ by execution of the equations (51), (52) using the prior deviation data $E_f[n-1]$, the prior data $b_{11}[n]$–$b_{22}[n]$, $k_1[n]$, $k_2[n]$, $\delta_f[n]$, $\delta_r[n]$, $E_f[n]$ and the present data $b_{11}[n+1]$–$b_{22}[n+1]$, $k_1[n+1]$, $k_2[n+1]$, $\delta_f[n+1]$, $\delta_r[n+1]$. At the following step 64, the computer 15 calculates the presently estimated lateral slip angle $\beta^*[n+1]$ and yaw rate $\gamma^*[n+1]$ by execution of the equation (50) using the previously estimated later slip angle $\beta^*[n]$ and yaw rate $\gamma^*[n]$ and the calculated values $d_1$, $d_2$ and using the coefficients $g_{11}$–$g_{22}$, $h_{11}$–$h_{22}$ as the present coefficient data $g_{11}[n+1]$–$g_{22}[n+1]$, $h_{11}[n+1]$–$h_{22}[n+1]$. Thus, the computer 15 calculates at step 66 a difference between the estimated yaw rate $\gamma^*[n+1]$ and the detected yaw rate $\gamma[n+1]$ on a basis of the following equation (54) and sets a resultant of the calculation as a deviation E[n+1].

$$E[n+1]=\gamma^*[n+1]-\gamma[n+1] \quad (54)$$

After processing at step 66, the computer 15 finishes the execution of the program at step 68. Thus, the estimated lateral slip angle $\beta^*[n+1]$ and yaw rate $\gamma^*[n+1]$ are used for control of the movement state of the vehicle.

As is understood from the above description, the movement state estimation method in the second embodiment is characterized in that an error in detection of the yaw rate $\gamma$ is corrected by the filter to effect accurate estimation of the lateral slip angle $\beta^*$ even if noise and temperature drift components are included in output of the yaw rate sensor 14.

Although in the foregoing embodiments the rear wheel steering angle $\delta_r$ has been detected in a wheeled vehicle the rear road wheels of which are dirigible, the rear wheel steering angle $\delta_r$ is calculated as a fixed value "0" in a wheeled vehicle the rear road wheels of which are not dirigible. Although in the foregoing embodiments the yaw rate $\gamma$ has been detected as a reference input to estimate the lateral slip angle $\beta^*$ and yaw rate $\gamma^*$ as movement state variables of the vehicle, a lateral speed or acceleration, a yaw angle speed or the like of the vehicle may be estimated as movement state variables of the vehicle.

What is claimed is:

1. A movement state estimation method wherein a movement state model of a wheeled vehicle is applied with steering angle data as a reference input for changing a coefficient and a feedback gain of movement state variables of the vehicle in accordance with a travel speed of the vehicle, and wherein an observer related to the movement state model is applied with at least one of observable movement state variables of the vehicle as a reference input for estimating at least one of unobserved movement state variables based on a state equation of the observer, the estimation method comprising the steps of:

detecting the steering angle data, travel speed and at least one of the observable movement state variables of the vehicle;

converting the state equation of the observer into a discrete equation by bilinear transformation or Tustin transformation using the detected steering angle data, travel speed and at least one of the observable movement state variables; and successively calculating the converted discrete equation to estimate at least one of said unobserved movement state variables.

2. A movement state estimation method as recited in claim 1, wherein said movement state model includes a filter for eliminating noise and temperature drift components caused by an error in said detection of the steering angle data, travel speed and at least one of the observable movement state variables.

3. A movement state estimation method as recited in claim 1, wherein the step of detecting at least one of the observable movement state variables of the vehicle comprises the step of detecting a yaw rate of the vehicle as the reference input, the step of converting the state equation of the observer into a discrete equation by bilinear transformation or Tustin transformation uses the detected yaw rate, and the step of successively calculating the converted discrete equation comprises the step of successively calculating the converted discrete equation to estimate a lateral slip angle of the vehicle.

4. A movement state estimation method as recited in claim 1, wherein said movement state model is in the form of a plant and includes feedback means for feeding back only an effective frequency component in an output deviation of said movement state model to an input side of said observer.

5. A movement state estimation method as recited in claim 4, wherein said feedback means comprises a first filter applied to an output of said plant for eliminating noise and temperature drift components caused by an error in said detection of the steering angle data, travel speed and at least one of the observable movement state variables, and wherein a second filter having the same filtering function as said first filter is applied to an output of said observer to eliminate a phase difference between the outputs of said plant and said observer.

6. A movement state estimation method as recited in claim 4, wherein said feedback means comprises a filter provided in said observer for eliminating noise and temperature drift components caused by an error in said detection of the steering angle data, travel speed and at least one of the observable movement state variables.

7. A movement state estimation method as recited in claim 5, wherein each of said first and second filters is in the form of a $2^{nd}$ order Butterworth filter.

* * * * *